United States Patent
Young et al.

(10) Patent No.: US 7,504,993 B2
(45) Date of Patent: Mar. 17, 2009

(54) COAXIAL BI-MODAL IMAGING SYSTEM FOR COMBINED MICROWAVE AND OPTICAL IMAGING

(75) Inventors: James E. Young, La Honda, CA (US); Gregory S. Lee, Mountain View, CA (US); William Weems, San Jose, CA (US)

(73) Assignee: Agilent Technolgoies, Inc., Santa Clara, CA (US)

( * ) Notice: Subject to any disclaimer, the term of this patent is extended or adjusted under 35 U.S.C. 154(b) by 0 days.

(21) Appl. No.: 11/580,132

(22) Filed: Oct. 12, 2006

(65) Prior Publication Data

US 2009/0040099 A1 Feb. 12, 2009

(51) Int. Cl.
*G01S 13/89* (2006.01)
*G01S 13/86* (2006.01)
*G01S 13/00* (2006.01)

(52) U.S. Cl. ............... 342/179; 342/22; 342/52; 342/53; 342/55; 342/175; 342/176; 342/195; 342/720; 342/721

(58) Field of Classification Search ............ 244/3.1–3.3; 342/21, 22, 25 R–25 F, 52–59, 62, 70–72, 342/175, 176, 179, 195, 368–377; 343/720, 343/721, 725; 250/336.1, 338.1, 339.01, 250/339.05, 339.06, 339.14, 339.15
See application file for complete search history.

(56) References Cited

U.S. PATENT DOCUMENTS

| | | | | |
|---|---|---|---|---|
| 2,972,743 A | * | 2/1961 | Svensson et al. | 342/53 |
| 3,114,149 A | * | 12/1963 | Jessen, Jr. | 343/720 |
| 3,798,795 A | * | 3/1974 | Michelsen | 342/55 |
| 3,981,010 A | * | 9/1976 | Michelsen | 342/55 |
| 4,071,843 A | * | 1/1978 | Marien | 342/55 |
| 4,264,907 A | * | 4/1981 | Durand et al. | 342/53 |
| 4,282,527 A | * | 8/1981 | Winderman et al. | 342/53 |
| 4,477,814 A | * | 10/1984 | Brumbaugh et al. | 343/725 |
| 4,502,025 A | | 2/1985 | Carl, Jr. et al. | |
| 4,649,393 A | | 3/1987 | Rittenbach | |
| 4,652,885 A | * | 3/1987 | Saffold et al. | 343/725 |
| 4,698,638 A | * | 10/1987 | Branigan et al. | 343/725 |
| 4,866,454 A | * | 9/1989 | Droessler et al. | 343/725 |
| 4,885,592 A | | 12/1989 | Kofol et al. | |
| 5,027,125 A | | 6/1991 | Tang | |

(Continued)

OTHER PUBLICATIONS

David M. Sheen et al.; "Three-Dimensional Millimeter-Wave Imaging for Concealed Weapon Detection"; IEEE Transactions On Microwave Theory And Techniques, vol. 49, No. 9, Sep. 2001, pp. 1581-1592.

(Continued)

*Primary Examiner*—Bernarr E Gregory

(57) ABSTRACT

A coaxial bi-modal imaging system is produced by aligning a microwave transceiver, an optical camera and an antenna array in a coaxial configuration. The microwave transceiver is operable to emit microwave radiation to illuminate an object and to receive reflected microwave radiation reflected from the object to capture a microwave image of the object. The antenna array includes a plurality of antenna elements, each programmable with a respective transmit direction coefficient to direct the microwave radiation emitted from said microwave transceiver toward a target on the object, and each programmable with a respective receive direction coefficient to direct the reflected microwave radiation reflected from said target towards said microwave transceiver. The optical camera is configured to capture an optical image of said object.

26 Claims, 5 Drawing Sheets

U.S. PATENT DOCUMENTS

| | | | |
|---|---|---|---|
| 5,081,456 A * | 1/1992 | Michiguchi et al. ............ 342/22 |
| 5,170,170 A | 12/1992 | Soumekh |
| 5,182,564 A * | 1/1993 | Burkett et al. ................. 342/53 |
| 5,268,680 A * | 12/1993 | Zantos ........................ 342/53 |
| 5,298,909 A * | 3/1994 | Peters et al. ................. 343/720 |
| 5,307,077 A * | 4/1994 | Branigan et al. ............ 343/720 |
| 5,308,984 A * | 5/1994 | Slawsby et al. ........... 250/338.1 |
| 5,327,149 A * | 7/1994 | Kuffer ........................ 343/720 |
| 5,365,237 A | 11/1994 | Johnson et al. |
| 5,940,030 A | 8/1999 | Hampel et al. |
| 5,940,045 A | 8/1999 | Belcher et al. |
| 5,982,326 A | 11/1999 | Chow et al. |
| 5,986,590 A | 11/1999 | Smith et al. |
| 6,036,140 A * | 3/2000 | Tranapp et al. ............. 244/3.16 |
| 6,037,908 A | 3/2000 | Phillips et al. |
| 6,043,786 A | 3/2000 | Vannatta et al. |
| 6,057,761 A | 5/2000 | Yukl |
| 6,150,974 A * | 11/2000 | Tasaka et al. ................. 342/53 |
| 6,242,740 B1 | 6/2001 | Luukanen et al. |
| 6,262,800 B1 * | 7/2001 | Minor ....................... 244/3.16 |
| 6,268,822 B1 * | 7/2001 | Sanders et al. ................ 342/54 |
| 6,353,224 B1 | 3/2002 | Sinclair et al. |
| 6,501,414 B2 | 12/2002 | Arndt et al. |
| 6,549,166 B2 | 4/2003 | Bhattacharyya et al. |
| 6,642,899 B2 | 11/2003 | McGrath |
| 7,032,858 B2 * | 4/2006 | Williams ................... 244/3.15 |
| 7,042,389 B2 * | 5/2006 | Shirai .......................... 342/70 |
| 7,183,966 B1 * | 2/2007 | Schramek et al. ............. 342/53 |
| 2003/0034916 A1 | 2/2003 | Kwon et al. |
| 2004/0056790 A1 | 3/2004 | Lovberg et al. |
| 2004/0080448 A1 | 4/2004 | Lovberg et al. |

OTHER PUBLICATIONS

P.F. Goldsmith, et al.; "Focal Plane Imaging Systems for Millimeter Wavelengths"; IEEE Transactions on Microwave Theory And Techniques, vol. 41, No. 10, Oct. 1993, pp. 1664-1675.

Tatsuo Nozokido, et al.; "Scanning Near-Field Millimeter-Wave Microscopy Using a Metal Slit as a Scanning Probe"; IEEE Transactions On Microwave Theory and Techniques, vol. 49, No. 3, Mar. 2001, pp. 491-499.

* cited by examiner

400
COAXIAL BI-MODAL IMAGING SYSTEM FOR COMBINED MICROWAVE AND OPTICAL IMAGING

CROSS-REFERENCE TO RELATED APPLICATIONS

This application is related by subject matter to U.S. Pat. No. 7,224,314, entitled "A Device for Reflecting Electromagnetic Radiation," which was filed on Nov. 24, 2004 and issued on May 29, 2007; U.S. patent application Ser. No. 10/997,583, entitled "Broadband Binary Phased Antenna," which was filed on Nov. 24, 2004; and U.S. Pat. No. 6,965,340, entitled "System and Method for Security Inspection Using Microwave Imaging," which was filed on Nov. 24, 2004 and issued on Nov. 15, 2005.

This application is further related by subject matter to U.S. Pat. No. 7,283,085, entitled "System and Method for Efficient, High-Resolution Microwave Imaging Using Complementary Transmit and Receive Beam Patterns," which was filed on Mar. 24, 2005 and issued on Oct. 16, 2007; U.S. Pat. No. 7,183,963, entitled "System and Method for Inspecting Transportable Items Using Microwave Imaging," which was filed on Mar. 24, 2005 and issued on Feb. 27, 2007; U.S. patent application Ser. No. 11/089,298, entitled "System and Method for Pattern Design in Microwave Programmable Arrays," which was filed on Mar. 24, 2005; U.S. Pat. No. 7,333,055, entitled "System and Method for Microwave Imaging Using an Interleaved Pattern in a Programmable Reflector Array," which was filed on Mar. 24, 2005 and issued on Feb. 19, 2008; and U.S. Pat. No. 7,327,304, entitled "System and Method for Minimizing Background Noise in a Microwave Image Using a Programmable Reflector Array" which was filed on Mar. 24, 2005 and issued on Feb. 5, 2008.

This application is further related by subject matter to U.S. Pat. No. 7,280,068, entitled "System and Method for Microwave Imaging with Suppressed Sidelobes Using Sparse Antenna Array," which was filed on Jul. 14, 2005, and issued on Oct. 9, 2007; U.S. Pat. No. 7,298,318, entitled "System and Method for Microwave Imaging Using Programmable Transmission Array," which was filed on Jun. 8, 2005 and issued on Nov. 20, 2007; U.S. patent application Ser. No. 11/303,581, entitled "Handheld Microwave Imaging Device", which was filed on Dec. 16, 2005 and has since gone abandoned; and U.S. patent application Ser. No. 11/303,294, entitled "System and Method for Standoff Microwave Imaging," which was filed on Dec. 16, 2005 and has since gone abandoned.

BACKGROUND OF THE INVENTION

Surveillance systems commonly employ optical video cameras operating in the visible light or near IR frequency range to monitor facilities. Historically, these cameras have transmitted analog video images of an area under surveillance to a security monitoring center for inspection and storage. In many facilities, analog video cameras are being replaced with digital cameras that detect and capture still images of events, such as the appearance of an intruder, a malfunction, or a fire within the area under surveillance. Digital cameras provide several advantages over analog video cameras. For example, digital cameras can be radio linked and battery powered to eliminate the need for the costly fixed infrastructure of video cables and power lines, making surveillance systems cheaper and easier to deploy.

However, digital cameras have limited sensitivity, and are not capable of imaging opaque or concealed items. For example, at a point-of-entry into a facility, such as a government building, school, airport or other structure, traditional analog or digital cameras are not able to identify concealed weapons or other contraband (e.g., explosives). Therefore, as a result of the need for improved surveillance systems, various microwave imaging systems have been developed as alternatives to existing optical systems. Microwave radiation is generally defined as electromagnetic radiation having wavelengths between radio waves and infrared waves. Since microwave radiation is non-ionizing, it poses no known health risks to people at moderate power levels. In addition, over the spectral band of microwave radiation, most dielectric materials, such as clothing, paper, plastic and leather are nearly transparent. Therefore, microwave imaging systems have the ability to penetrate clothing to image items concealed by clothing.

At present, there are several microwave imaging techniques available. For example, one technique uses an array of microwave detectors (hereinafter referred to as "antenna elements") to capture either passive microwave radiation emitted by a target associated with the person or other object or reflected microwave radiation reflected from the target in response to active microwave illumination of the target. A two-dimensional or three-dimensional image of the person or other object is constructed by scanning the array of antenna elements with respect to the target's position and/or adjusting the frequency (or wavelength) of the microwave radiation being transmitted or detected.

Microwave imaging systems typically include transmit, receive and/or reflect antenna arrays for transmitting, receiving and/or reflecting microwave radiation to/from the object. Such antenna arrays can be constructed using traditional analog phased arrays or binary reflector arrays. In either case, the antenna array typically directs a beam of microwave radiation containing a number of individual microwave rays towards a point or area/volume in 3D space corresponding to a voxel or a plurality of voxels in an image of the object, referred to herein as a target. This is accomplished by programming each of the antenna elements in the array with a respective phase shift that allows the antenna element to modify the phase of a respective one of the microwave rays. The phase shift of each antenna element is selected to cause all of the individual microwave rays from each of the antenna elements to arrive at the target substantially in-phase. Examples of programmable antenna arrays are described in U.S. Pat. No. 7,224,314, entitled "A Device for Reflecting Electromagnetic Radiation," and U.S. patent application Ser. No. 10/997,583, entitled "Broadband Binary Phased Antenna, filed Nov. 24, 2004."

Recently, "bi-modal" imaging systems that augment an optical imaging system, such as an analog video camera or digital camera, with a microwave imaging system have been proposed. The optical image captured by the optical imaging system is combined with the microwave image captured by the microwave imaging system to produce a more detailed image than that achievable with either imaging system alone.

In a typical configuration, the optical camera is mounted in the center of the array of antenna elements and a microwave transceiver is mounted on an arm orthogonal to the antenna array to transmit/receive microwave radiation to/from the antenna array. This configuration ensures that the optical camera does not block transmission of the reflected microwave radiation towards the microwave transceiver, and therefore, the optical camera does not interfere with the microwave image. However, in this configuration, the resulting optical and microwave images experience a parallax effect (shifting) due to the different focal points of the optical camera and the microwave transceiver, which increases the complexity of the image processing. In addition, the mounting arms necessarily increase the size of the bi-modal imaging system, which may not be desirable in some situations.

Therefore, what is needed is a bi-modal imaging system with reduced image processing. In addition, what is needed is a compact bi-modal imaging system.

SUMMARY OF THE INVENTION

Embodiments of the present invention provide a bi-modal imaging system. The bi-modal imaging system includes a microwave transceiver operable to emit microwave radiation to illuminate an object and to receive reflected microwave radiation reflected from the object to capture a microwave image of the object and an antenna array includes a plurality of antenna elements, each programmable with a respective transmit direction coefficient to direct the microwave radiation emitted from said microwave transceiver toward a target on the object, and each programmable with a respective receive direction coefficient to direct the reflected microwave radiation reflected from said target towards said microwave transceiver. The bi-modal imaging system further includes an optical camera configured to capture an optical image of said object. The microwave transceiver, optical camera and antenna array are aligned in a coaxial configuration.

In one embodiment, the microwave transceiver, antenna array and optical camera are aligned along an axis extending therethrough. The axis is orthogonal to the plane of the antenna array and extends through a center of the antenna array.

In an exemplary embodiment, the microwave transceiver is mounted to the antenna array to emit microwave radiation from a front side of the microwave transceiver towards the antenna elements and the optical camera is mounted to a back side of the microwave transceiver opposite the front side to receive light directed towards the back side of the microwave transceiver.

In another exemplary embodiment, a reflective disc is included that is operable to reflect the microwave radiation emitted from the microwave transceiver towards the antenna elements and to reflect the reflected microwave radiation reflected from the antenna elements towards the microwave transceiver. In one embodiment, a back side of the microwave transceiver is mounted to the antenna array and the reflective disc is mounted to a front side of the microwave transceiver such that the microwave transceiver emits microwave radiation from the front side of the microwave transceiver towards a reflective surface the reflective disc. In addition, the optical camera is mounted to the reflective disc opposite the reflective surface to receive light directed towards the front side of the microwave transceiver. In another embodiment, the microwave transceiver is mounted to a back side of the antenna array and the reflective disc is mounted to a front side of the antenna array such that the microwave transceiver emits microwave radiation through a hole in the antenna array towards a reflective surface the reflective disc. In addition, the optical camera is mounted to the reflective disc opposite the reflective surface to receive light directed towards the front side of the antenna array. In a further embodiment, the antenna array has a curved surface.

In another embodiment, the bi-modal imaging system includes a processor operable to measure a respective intensity of the reflected microwave radiation to determine a value of a voxel within the microwave image of the object, and to construct the microwave image of the object by programming the antenna elements to scan multiple targets on the object to measure the respective intensity of reflected microwave radiation from each of the multiple targets. In yet another embodiment, the optical camera includes a plurality of photo detectors, each operable to measure the intensity of light received at the photo detector and to produce optical image data representative thereof. In this embodiment, the processor is further operable to receive the optical image data from the optical camera, process the optical image data to produce processed optical image data and produce the optical image from the processed optical image data.

In a further embodiment, the processor is operable to produce a bi-modal image from a combination of the optical image and the microwave image. In still a further embodiment, the processor is operable to extract optical image information from the optical image data and to use the optical image information to identify a region of interest associated with the object and to control the array to illuminate only targets within the region of interest to produce the microwave image with only the region of interest.

Embodiments of the present invention further provide a method for producing a coaxial bi-modal imaging system. The method includes providing a microwave transceiver operable to emit microwave radiation to illuminate an object and to receive reflected microwave radiation reflected from the object to capture a microwave image of the object, providing an antenna array including a plurality of antenna elements, each programmable with a respective transmit direction coefficient to direct the microwave radiation emitted from the microwave transceiver toward a target on the object, and each programmable with a respective receive direction coefficient to direct the reflected microwave radiation reflected from the target towards the microwave transceiver and providing an optical camera configured to capture an optical image of the object. The method further includes aligning the microwave transceiver, the antenna array and the optical camera in a coaxial configuration.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE EXEMPLARY EMBODIMENTS

As used herein, the terms microwave radiation and microwave illumination each refer to the band of electromagnetic radiation having wavelengths between 0.3 mm and 30 cm, corresponding to frequencies of about 1 GHz to about 1,000 GHz. Thus, the terms microwave radiation and microwave illumination each include traditional microwave radiation, as well as what is commonly known as millimeter wave radiation. In addition, as used herein, the term "microwave imaging system" refers to an imaging system operating in the microwave frequency range, and the resulting images obtained by the microwave imaging system are referred to herein as "microwave images." Furthermore, as used herein, the term "optical imaging system" refers to an imaging system operating in the visible light or near IR frequency range, and the resulting images obtained by the optical imaging system are referred to as "optical images" in order to differentiate these images from microwave images obtained by the microwave imaging system.

Figure 1:
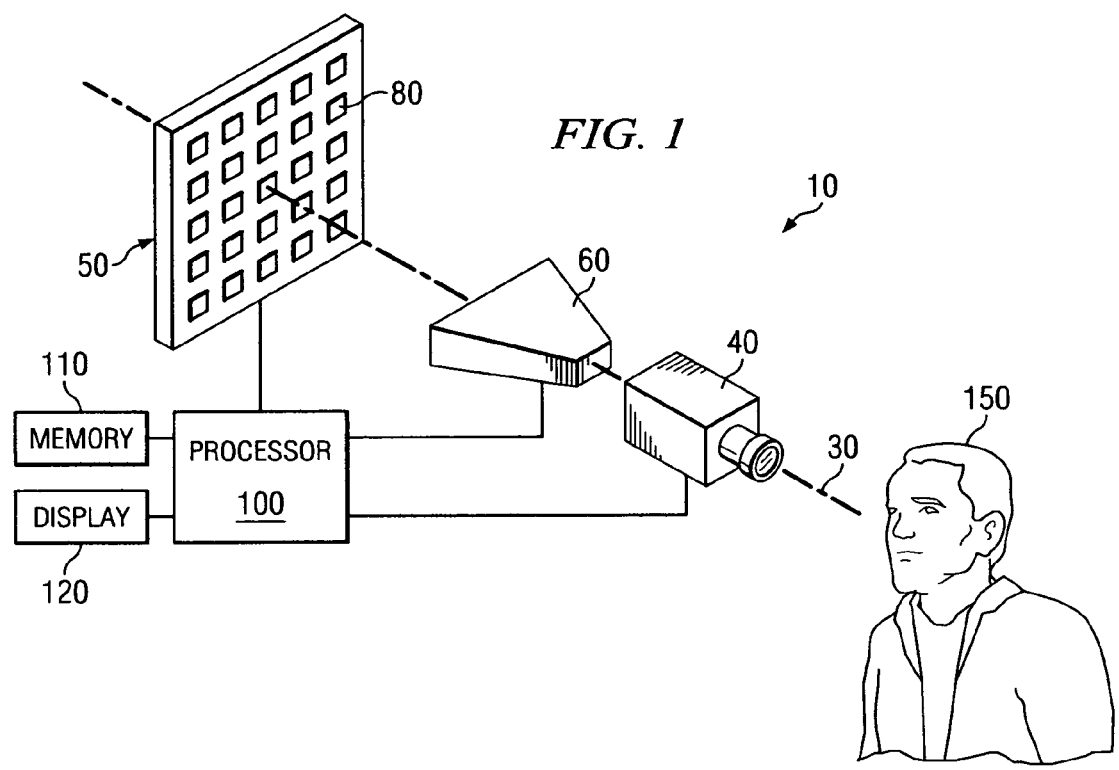
FIG. 1 is a schematic block diagram illustrating an exemplary coaxial bi-modal imaging system, in accordance with embodiments of the present invention.

Referring now to FIG. 1, there is illustrated an exemplary coaxial bi-modal imaging system 10 that augments an optical imaging system with a microwave imaging system, in accordance with embodiments of the present invention. The bi-modal imaging system 10 can be used, for example, to provide ongoing surveillance to control a point-of-entry into a structure, monitor passers-by in an area (e.g., a hallway, a room or outside of a building) or to screen individual persons or other items of interest.

As can be seen in FIG. 1, the bi-modal imaging system 10 includes an optical imaging system in the form of an optical camera 40, such as an analog video camera or digital camera, and a microwave imaging system in the form of a microwave transceiver 60 and an array 50 of antenna elements 80. The optical camera 40 is capable of capturing an optical image of an object 150 (e.g., a suitcase, human subject or other item of interest), while each of the antenna elements 80 in the array 50 is capable of directing microwave radiation to/from the microwave transceiver 60 to capture a microwave image of the object 150. The optical imaging system may also include a light source (not shown) for illuminating the object 150 with light. The light source can be any suitable source of visible or near IR light. For example, the light source can include one or more light emitting elements, such as one or more point light sources, one or more collimated or structured light sources, one or more arrays of light sources, or any other combination of light sources suitable for use in the optical imaging system.

The optical camera 40 includes a lens (not shown) and optical image sensor (not shown), e.g., a CCD (Charge Coupled Device), a CMOS-APS (Complimentary Metal Oxide Semiconductor-Active Pixel Sensor) or any other type of optical sensor known in the art. The optical image sensor is composed of multiple light sensing elements, hereinafter referred to as photo detectors. The photo detectors can be, for example, photodiodes or phototransistors. Visible or IR light reflected off the object 150 is directed by the lens to the optical image sensor within the camera 40. The optical image sensor acquires an image of the object in the form of optical image data representing the intensity of the reflected light measured at each photo detector. Thus, each photo detector captures a picture element (pixel) of the image, and all pixels are combined to form the complete image.

The array 50 in the microwave imaging system includes a plurality of programmable antenna elements 80 for directing microwave radiation between the microwave transceiver 60 and the object 150. For example, in one embodiment, each of the antenna elements 80 is programmable with a respective transmit direction coefficient (e.g., a transmission coefficient or a reflection coefficient) to direct a beam of microwave radiation from the microwave transceiver 60 towards a target on the object 150. As used herein, the term "target" refers to a point or area/volume in 3D space corresponding to a voxel or a plurality of voxels in a microwave image of the object 150. In addition, each of the antenna elements 80 is also programmable with an additional respective receive direction coefficient (e.g., a transmission coefficient or a reflection coefficient) to receive reflected microwave illumination reflected from the target on the object 150 and direct the received microwave illumination towards the microwave transceiver 60. In an exemplary embodiment, the array 50 operates at a frequency that enables potentially millions of targets in a volume to be scanned per second.

In one embodiment, the array 50 is a dense array of antenna elements 80 to achieve the largest addressable volume with the highest spatial resolution. For example, the array 50 can be densely filled with antenna elements 80 such that the spacing between adjacent antenna elements in both directions is $\lambda/2$, where $\lambda$ is a small wavelength. In another embodiment, the array 50 includes subarrays of antenna elements arranged in a sparse geometry to form complementary subarray patterns thereof, thereby reducing the number of antenna elements 80 within the array 50, as described in U.S. Pat. No. 7,280,068, entitled "System and Method for Microwave Imaging with Suppressed Sidelobes Using A Sparse Antenna Array," which was filed on Jul. 14, 2005, filed Oct. 9, 2007. In a further embodiment, the array 50 has a curved surface to facilitate focusing around the microwave transceiver 60 and optical camera 40.

Figure 2:
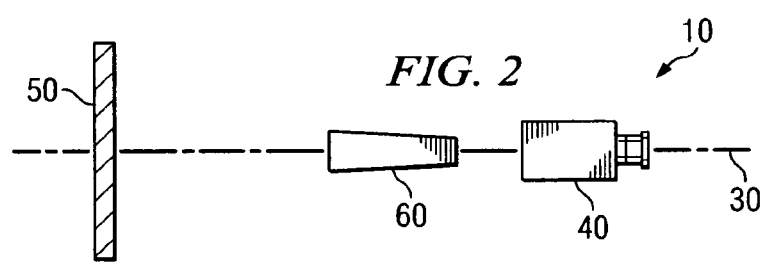
FIG. 2 is a side view of the coaxial bi-modal imaging system, in accordance with embodiments of the present invention.

As shown in FIG. 1 and in the side view of FIG. 2, the array 50, microwave transceiver 60 and optical camera 40 are aligned along an alignment axis 30 to produce a coaxial configuration of the bi-modal imaging system 10. As a result, the focal points of the optical imaging system and the microwave imaging system are also coaxial, which minimizes any parallax effect in the resulting optical and microwave images. As shown in FIGS. 1 and 2, the alignment axis 30 extends substantially through a center of the array 50 in a direction orthogonal to the plane of the array 50 and substantially through respective midpoints of the microwave transceiver 60 and optical camera 40. In other embodiments, the alignment axis 30 can be offset from the center of the array 50 and/or the midpoints of the microwave transceiver 60 and optical camera 40, depending upon the intended use and/or location of the bi-modal imaging system 10.

Aligning the array 50, microwave transceiver 60 and optical camera 40 through a single axis 30, as shown in FIGS. 1 and 2, enables compact mounting of the transceiver 60 and optical camera 40 within the bi-modal imaging system 10. For example, in one embodiment, the microwave transceiver 60 can be mounted to the array 50, such that the microwave transceiver 60 emits microwave radiation from a front side thereof towards the antenna elements 80, and the optical camera 40 can be mounted to a back side of the microwave transceiver 60 opposite the front side of the microwave transceiver 60 to receive light directed towards the back side of the microwave transceiver 60.

Referring again to FIG. 1, the bi-modal imaging system 10 further includes a processor 100, computer-readable medium 110 and a display 120. The processor 100 includes any hardware, software, firmware, or combination thereof for controlling the array 50, processing the optical image data from the optical camera 40 and processing the microwave image data from the microwave transceiver 60 for use in constructing an optical image, a microwave image and/or a bi-modal image of the object 150. For example, the processor 100 may include one or more microprocessors, microcontrollers, programmable logic devices, digital signal processors or other type of processing devices that are configured to execute instructions of a computer program, and one or more memories (e.g., cache memory) that store the instructions and other data used by the processor 100. The memory 110 includes any type of data storage device, including but not limited to, a hard drive, random access memory (RAM), read only memory (ROM), compact disc, floppy disc, ZIP® drive, tape drive, database or other type of storage device or storage medium.

In particular, the processor 100 operates to program the antenna array 50 to illuminate multiple targets on the object 150. In exemplary embodiments, the processor 100 programs respective amplitude/phase delays or amplitude/phase shifts into each of the individual antenna elements 80 in the array 50 to illuminate each target on the object 150. In addition, the processor 100 programs respective amplitude/phase delays or amplitude/phase shifts into each of the individual antenna elements 80 in the array 50 to direct reflected microwave illumination from each target on the object 150 toward the microwave transceiver 60. In embodiments using phase shifts, the programmed phase shifts can be either binary phase shifts, some other multiple number of phase shifts or continuous phase shifts.

The processor 100 further operates to process the optical image data received from the optical camera 40 to produce an optical image of the object 50. In addition, the processor 100 operates to process the microwave image data received from the microwave transceiver 60 to construct a microwave image of the object 150. For example, in one embodiment, the processor 100 uses the intensity of the reflected microwave radiation captured by the array 50 from each target on the object 150 to construct the microwave image of the object 150. In embodiments in which the array 50 is a reflector array, the microwave transceiver 60 is capable of combining the reflected microwave radiation reflected from each antenna element 80 in the array 50 to produce a value of the effective intensity of the reflected microwave radiation at the target. The intensity value is passed to the processor 100, which uses the intensity value as the value of a pixel or voxel corresponding to the target on the object 150. In other embodiments in which the reflected microwave radiation represents the intensity of an area/volume of voxels, for each microwave image of a target (area/volume in 3D space), the processor 100 measures a Fourier transform component of the desired image of the object 150. The processor 100 performs an inverse Fourier transform using the measured Fourier transform components to produce the image of the object 150.

In one embodiment, the processor 100 combines the microwave image and the optical image to produce a bi-modal image of the object 150. For example, the bi-modal image can be produced from an addition of the microwave image and the optical image, such that the bi-modal image contains more detail than in either the optical image or the microwave image. As another example, the bi-modal image can be produced from a subtraction of one of the images (microwave or optical) from the other.

In another embodiment, the optical image data is used by the processor 100 to capture the microwave image of the object 150. For example, in an exemplary embodiment, the optical image data can be used to identify a spatial region of interest (i.e., data points) within a volume addressable by the microwave imaging system. The identified data points corresponding to the spatial region of interest can be used by the processor 150 to program the antenna elements 80 to direct microwave radiation to only the spatial region of interest.

The resulting bi-modal image, microwave image and/or optical image of the object 150 can be passed from the processor 100 to the display 120 to display the image. In one embodiment, the display 120 is a two-dimensional display for displaying three-dimensional images of the object 150 or one or more one-dimensional or two-dimensional images of the object 150. In another embodiment, the display 120 is a three-dimensional display capable of displaying three-dimensional images of the object 150.

Figure 3:
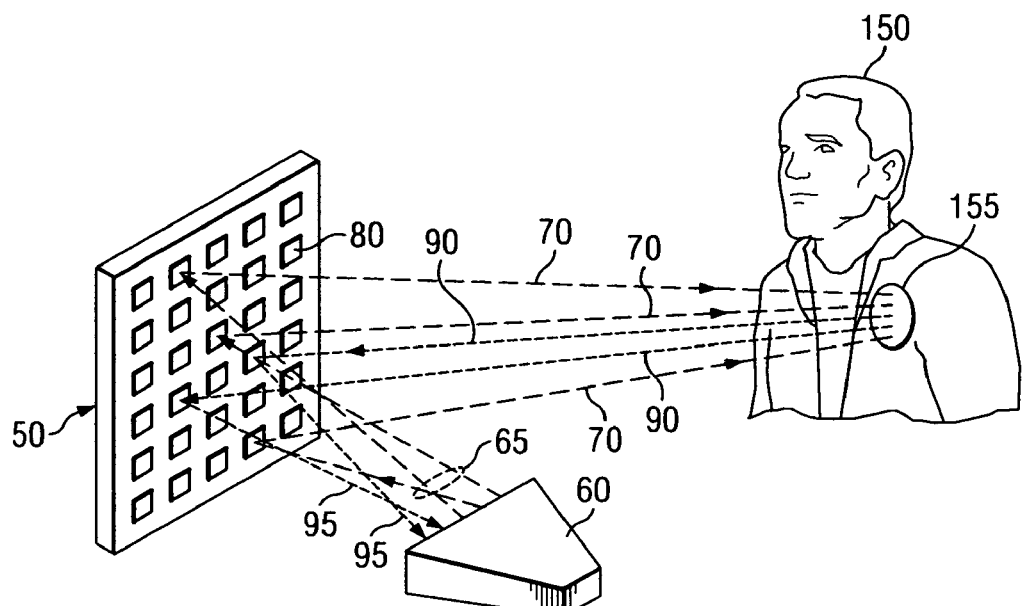
FIG. 3 is a schematic diagram illustrating an exemplary operation of the microwave imaging system within the bi-modal imaging system of the present invention.

FIG. 3 is a schematic diagram of a top view of an exemplary array 50 for reflecting microwave radiation, in accordance with embodiments of the present invention. In FIG. 3, the microwave antenna (microwave transceiver) 60 functions as both a microwave source and a microwave receiver to produce a confocal microwave imaging system. The microwave transceiver 60 can be any source sufficient for illuminating the array 50, including, but not limited to, a point source, a horn antenna or any other type of antenna. The microwave transceiver 60 is located in front of the array 50 to illuminate the array 50 from the front (i.e., the transceiver 60 is situated between the object 150 being imaged and the array 50).

In FIG. 3, a source beam 65 of microwave radiation transmitted from the microwave transceiver 60 is received by various antenna elements 80 in the array 50. The antenna elements 80 within the array 50 are each programmed with a respective phase-shift to direct a transmit beam 70 of reflected microwave radiation towards a target 155 on the object 150 being imaged. The phase-shifts are selected to create positive (constructive) interference between all of the microwave rays within the beam of reflected microwave radiation 70 at the target 155. Ideally, the phase-shift of each of the antenna elements 80 is adjusted to provide the same phase delay for each microwave ray of the reflected microwave radiation 70 from the source (antenna elements 80) to the target 155.

In a similar manner, as shown in FIG. 3, a reflect beam 90 of microwave radiation reflected from the target 155 and received at the array 50 can be reflected as a receive beam 95 of reflected microwave radiation towards the microwave transceiver 60. Again, the phase-shifts are selected to create positive (constructive) interference between all of the microwave rays within the beam of reflected microwave radiation 90 at the microwave transceiver 60.

Figure 4:
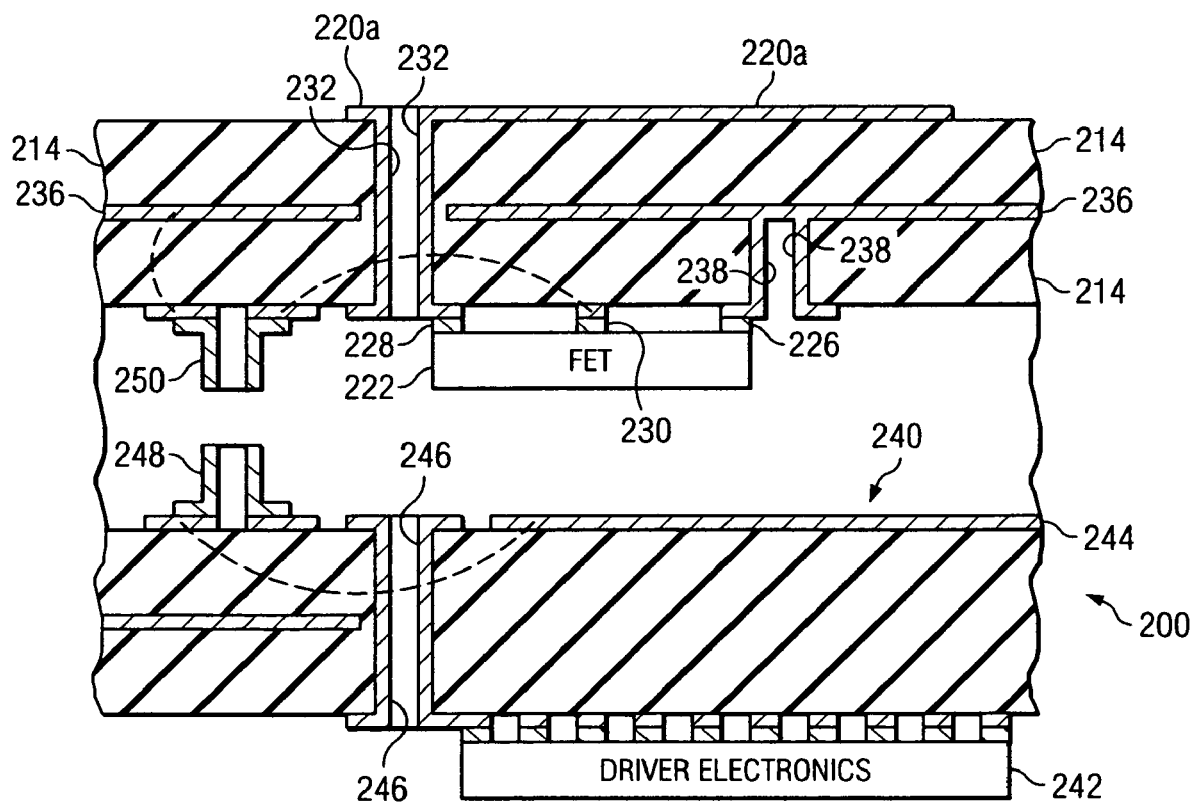
FIG. 4 is a cross-sectional view of an exemplary passive antenna element for use in a transmissive/reflective antenna array, in accordance with embodiments of the present invention.

FIG. 4 illustrates a cross-sectional view of a reflecting antenna element 200 (corresponding to antenna element 80 in FIGS. 1-3) that operates to reflect electromagnetic radiation with varying phase depending on the impedance state of the antenna element 200. The reflecting antenna element 200 includes an antenna (patch antenna 220a) and a non-ideal switching device (surface mounted field effect transistor "FET" 222).

The reflecting antenna element 200 is formed on and in a printed circuit board substrate 214 and includes the surface mounted FET 222, the patch antenna 220a, a drain via 232, a ground plane 236 and a source via 238. The surface mounted FET 222 is mounted on the opposite side of the printed circuit board substrate 214 as the planar patch antenna 220a and the ground plane 236 is located between the planar patch antenna 220a and the surface mounted FET 222. The drain via 232 connects the drain 228 of the surface mounted FET 222 to the planar patch antenna 220a and the source via 238 connects the source 226 of the surface mounted FET 222 to the ground plane 236.

In exemplary embodiments, the reflector antenna array is connected to a controller board 240 that includes driver electronics. The example controller board 240 depicted in FIG. 4 includes a ground plane 244, a drive signal via 246, and driver electronics 242. The controller board 240 also includes connectors 248 that are compatible with connectors 250 of the reflector antenna array. The connectors 248 and 250 of the two boards can be connected to each other, for example, using wave soldering. It should be understood that in other embodiments, the FET 222 can be surface mounted on the same side of the printed circuit board substrate 214 as the planar patch antenna 220a. Additionally, the driver electronics 242 can be soldered directly to the same printed circuit board in which the reflecting antenna element 200 is built.

The patch antenna element 220a functions to reflect with more or less phase shift depending on the impedance level of the reflecting antenna element 200. The reflecting antenna element 200 has an impedance characteristic that is a function of the antenna design parameters. Design parameters of antennas include but are not limited to, physical attributes such as the dielectric material of construction, the thickness of the dielectric material, shape of the antenna, length and width of the antenna, feed location, and thickness of the antenna metal layer.

The FET 230 (non-ideal switching device) changes the impedance state of the reflecting antenna element 200 by changing its resistive state. A low resistive state (e.g., a closed or "short" circuit) translates to a low impedance. Conversely, a high resistive state (e.g., an open circuit) translates to a high impedance. A switching device with ideal performance characteristics (referred to herein as an "ideal" switching device) produces effectively zero impedance (Z=0) when its resistance is at its lowest state and effectively infinite impedance (Z=∞) when its resistance is at its highest state. As described herein, a switching device is "on" when its impedance is at its lowest state (e.g., $Z_{on}=0$) and "off" when its impedance is at its highest state (e.g., $Z_{off}=\infty$). Because the on and off impedance states of an ideal switching device are effectively $Z_{on}=0$ and $Z_{off}=\infty$, an ideal switching device is able to provide the maximum phase shift without absorption of electromagnetic radiation between the on and off states. That is, the ideal switching device is able to provide switching between 0 and 180 degree phase states. In the case of an ideal switching device, maximum phase-amplitude performance can be achieved with an antenna that exhibits any finite non-zero impedance.

In contrast to an ideal switching device, a "non-ideal" switching device is a switching device that does not exhibit on and off impedance states of $Z_{on}=0$ and $Z_{off}=\infty$, respectively. Rather, the on and off impedance states of a non-ideal switching device are typically, for example, somewhere between $0<|Z_{on}|<|Z_{off}|$. However, in some applications, the on and off impedance states may even be $|Z_{off}|<=|Z_{on}|$. A non-ideal switching device may exhibit ideal impedance characteristics within certain frequency ranges (e.g., <10 GHz) and highly non-ideal impedance characteristics at other frequency ranges (e.g., >20 GHz).

Because the on and off impedance states of a non-ideal switching device are somewhere between $Z_{on}=0$ and $Z_{off}=\infty$, the non-ideal switching device does not necessarily provide the maximum phase state performance regardless of the impedance of the corresponding antenna, where maximum phase state performance involves switching between 0 and 180 degree phase states. In accordance with one embodiment of the invention, the reflecting antenna element 200 of FIG. 4 is designed to provide optimal phase performance, where the optimal phase state performance of a reflecting antenna element is the point at which the reflecting element is closest to switching between 0 and 180 degree phase-amplitude states. In an exemplary embodiment, to achieve optimal phase state performance, the antenna element 200 is configured as a function of the impedance of the non-ideal switching device (FET 230). For example, the antenna element 200 can be designed such that the impedance of the antenna element 200 is a function of impedance characteristics of the FET 230.

Further, the antenna element 200 is configured as a function of the impedance of the non-ideal switching device (FET 230) in the on state, $Z_{on}$, and the impedance of the non-ideal switching device 230 in the off state, $Z_{off}$. In a particular embodiment, the phase state performance of the reflecting antenna element 200 is optimized when the antenna element 200 is configured such that the impedance of the antenna element 200 is conjugate to the square root of the impedance of the non-ideal switching device 230 when in the on and off impedance states, $Z_{on}$ and $Z_{off}$. Specifically, the impedance of the antenna element 200 is the complex conjugate of the geometric mean of the on and off impedance states, $Z_{on}$ and $Z_{off}$, of the corresponding non-ideal switching device 230. This relationship is represented as:

$$Z_{antenna}^* = \sqrt{Z_{on} Z_{off}}, \qquad (1)$$

where ( )* denotes a complex conjugate. The above-described relationship is derived using the well-known formula for the complex reflection coefficient between a source impedance and a load impedance. Choosing the source to be the antenna element 200 and the load to be the non-ideal switching device 230, the on-state reflection coefficient is set to be equal to the opposite of the off-state reflection coefficient to arrive at equation (1).

Designing the antenna element 200 to exhibit optimal phase-amplitude performance involves determining the on and off impedances, $Z_{on}$ and $Z_{off}$ of the particular non-ideal switching device that is used in the reflecting antenna element 200 (in this case, FET 230). Design parameters of the antenna element 200 are then manipulated to produce an antenna element 200 with an impedance that matches the relationship expressed in equation (1) above. An antenna element 200 that satisfies equation (1) can be designed as long as $Z_{on}$ and $Z_{off}$ are determined to be distinct values.

Another type of switching device, other than the surface mounted FET 230 shown in FIG. 4, that exhibits non-ideal impedance characteristics over the frequency band of interest is a surface mount diode. However, although surface mounted diodes exhibit improved impedance characteristics over the frequency band of interest compared to surface mounted FETs, surface mounted FETs are relatively inexpensive and can be individually packaged for use in reflector antenna array applications.

In a reflector antenna array that utilizes FETs as the non-ideal switching devices, the beam-scanning speed that can be achieved depends on a number of factors including signal-to-noise ratio, crosstalk, and switching time. In the case of a FET, the switching time depends on gate capacitance, drain-source capacitance, and channel resistance (i.e., drain-source resistance). The channel resistance is actually space-dependent as well as time-dependent. In order to minimize the switching time between impedance states, the drain of the FET is preferably DC-shorted at all times. The drain is preferably DC-shorted at all times because floating the drain presents a large off-state channel resistance as well as a large drain-source capacitance due to the huge parallel-plate area of the patch antenna. This implies that the antenna is preferably DC-shorted but one wishes the only "rf short" the antenna sees be at the source. Therefore, the additional antenna/drain short should be optimally located so as to minimally perturb the antenna.

It should be understood that other types of antennas can be used in the reflecting antenna element 200, instead of the patch antenna 220a. By way of example, but not limitation, other antenna types include dipole, monopole, loop, and dielectric resonator type antennas. In addition, in other embodiments, the reflecting antenna element 200 can be a continuous phase-shifted antenna element 200 by replacing the FETs 230 with variable capacitors (e.g., Barium Strontium Titanate (BST) capacitors). With the variable capacitor loaded patches, continuous phase shifting can be achieved for each antenna element 200, instead of the binary phase shifting produced by the FET loaded patches. Continuous phased arrays can be adjusted to provide any desired phase shift in order to steer a microwave beam towards any direction in a beam scanning pattern.

Figure 5:
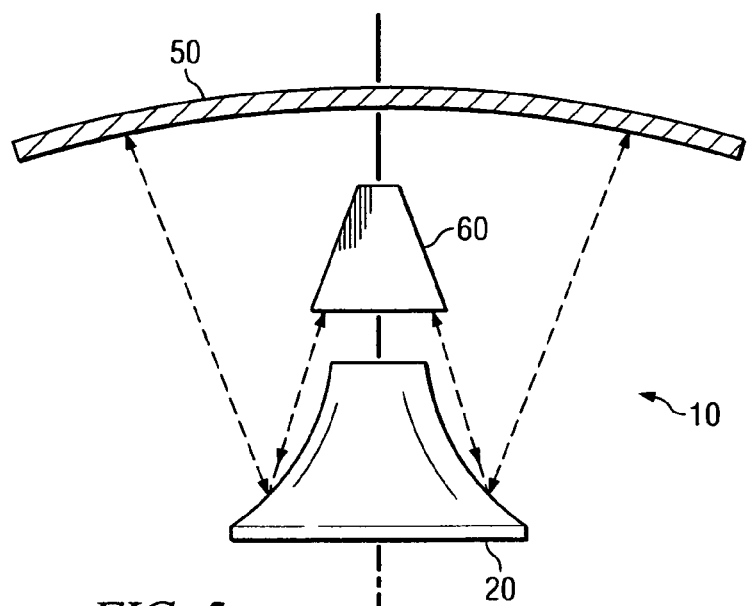
FIG. 5 is a schematic diagram illustrating another exemplary coaxial bi-modal imaging system, in accordance with embodiments of the present invention.

FIG. 5 is a schematic diagram illustrating another exemplary coaxial bi-modal imaging system 10, in accordance with embodiments of the present invention. In FIG. 5, a reflective disc 20 is included in the bi-modal imaging system 10 to reflect microwave radiation emitted from the microwave transceiver 60 towards the curved array 50 and to reflect reflected microwave radiation reflected from the array 50 towards the microwave transceiver 60. Thus, the reflective disc 20 has a surface that is reflective at the appropriate wavelength. In one embodiment, the reflective disc 20 is made of materials that are reflective in the microwave range. In another embodiment, the outer surface of the reflective disc 20 is coated with a material that is reflective in the microwave range.

As in FIGS. 1 and 2, the array 50, microwave transceiver 60, reflective disc 20 and optical camera 40 are aligned along an alignment axis 30 to produce a coaxial configuration of the bi-modal imaging system 10, and therefore, coaxial focal points of the optical imaging system and the microwave imaging system. In addition, as shown in FIG. 5, the array 50 is curved towards the transceiver 60 and reflective disc 20 to enable focusing around the reflective disc 20, microwave transceiver 60 and optical camera 40. As a result, objects that are located along the alignment axis 30 in front of the optical camera 40 are visible to the microwave imaging system.

In FIG. 5, the microwave transceiver 60 is shown positioned between the array 50 and the reflective disc 20 for convenient mounting. For example, in one embodiment, a back side of the microwave transceiver 60 is mounted to the array 50 and the reflective disc 20 is mounted to a front side of the microwave transceiver 60, such that the microwave transceiver 60 emits microwave radiation from the front side thereof towards the reflective surface of the reflective disc 20. In addition, the optical camera 40 is mounted to the reflective disc 20 opposite the reflective surface to receive light directed towards the front side of the microwave transceiver 60.

Figure 6:
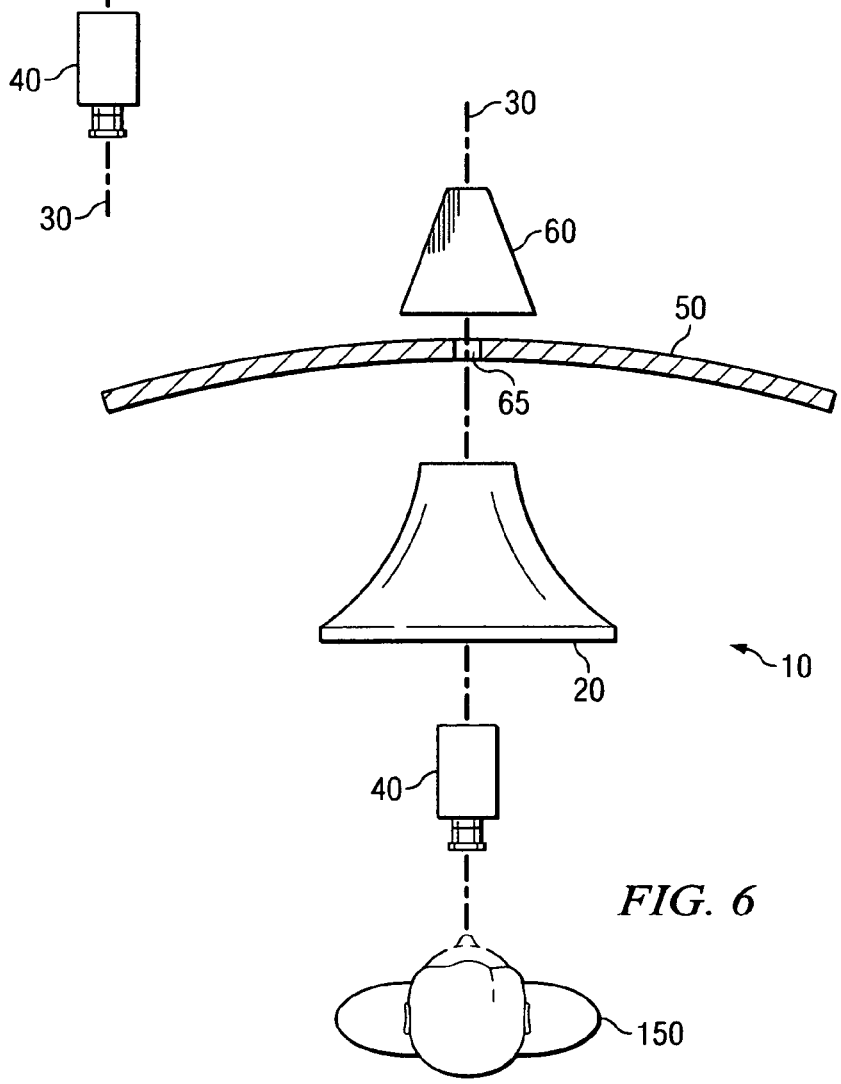
FIG. 6 is a schematic diagram illustrating yet another exemplary coaxial bi-modal imaging system, in accordance with embodiments of the present invention.
Figure 7:
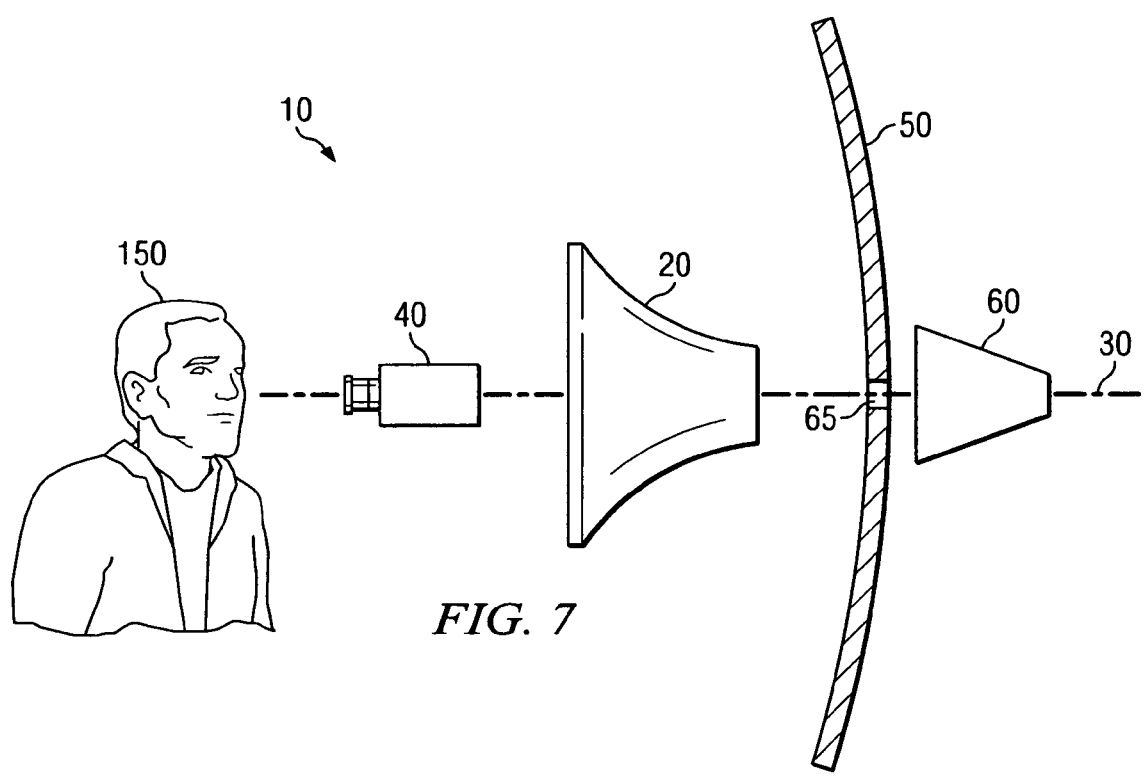
FIG. 7 is a side view of the coaxial bi-modal imaging system of FIG. 6.

In another embodiment, as shown in FIGS. 6 and 7, the microwave transceiver 60 can be positioned behind the array 50 and the reflective disc 20 can be positioned in front of the array 50. In this embodiment, the microwave radiation emitted from the microwave transceiver 60 passes through the array 50 (e.g., a hole 65 within the center of the array 50) and reflects off the reflective disc 20 towards the antenna elements of the antenna array 50. The antenna elements 80 then reflect the microwave radiation toward the object 150 based on their respective programmed transmit direction coefficients. Likewise, reflected microwave radiation reflected off the object 150 and received at the antenna elements of the array 50 is reflected towards the reflective disc 20 based on the respective programmed receive direction coefficients of the antenna elements. The reflective disc 20 then reflects the reflected microwave radiation back to the microwave transceiver 60 through the hole 65 in the array 50. The microwave transceiver 60 can be either mounted to the back side of the array 50 or within the array 50 (e.g., within the hole 65 in the array 50).

Figure 8A:
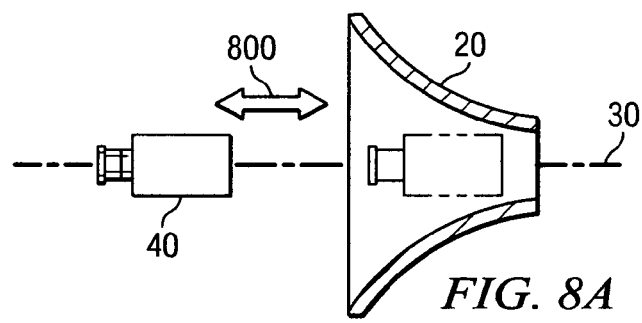
FIGS. 8A and 8B are schematic diagrams illustrating exemplary techniques for mounting an optical camera within the coaxial bi-modal imaging system.
Figure 8B:
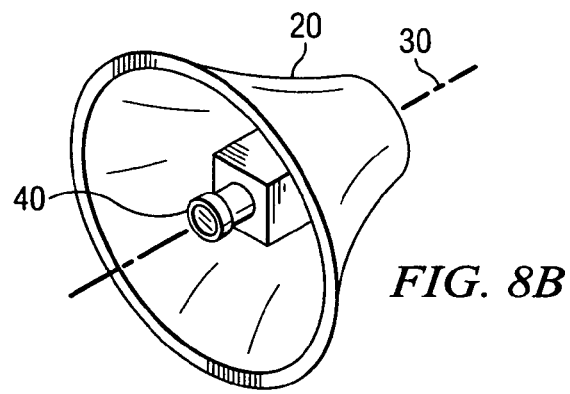

FIGS. 8A and 8B are schematic diagrams illustrating exemplary techniques for mounting the optical camera 40 within the coaxial bi-modal imaging system. As can be seen in FIG. 8A, the optical camera 40 can be mounted along the alignment axis 30 within a mounting area 800 that extends from the inside of the reflective disc 20 out to a minimal distance from the reflective disc 20. The distance is selected based on the mounting technique used to mount the optical camera 40 to the reflective disc 20. In an exemplary embodiment, as shown in FIG. 8B, the optical camera 40 can be mounted inside of the reflective disc 20 for maximum compactness of the bi-modal imaging system.

Figure 9:
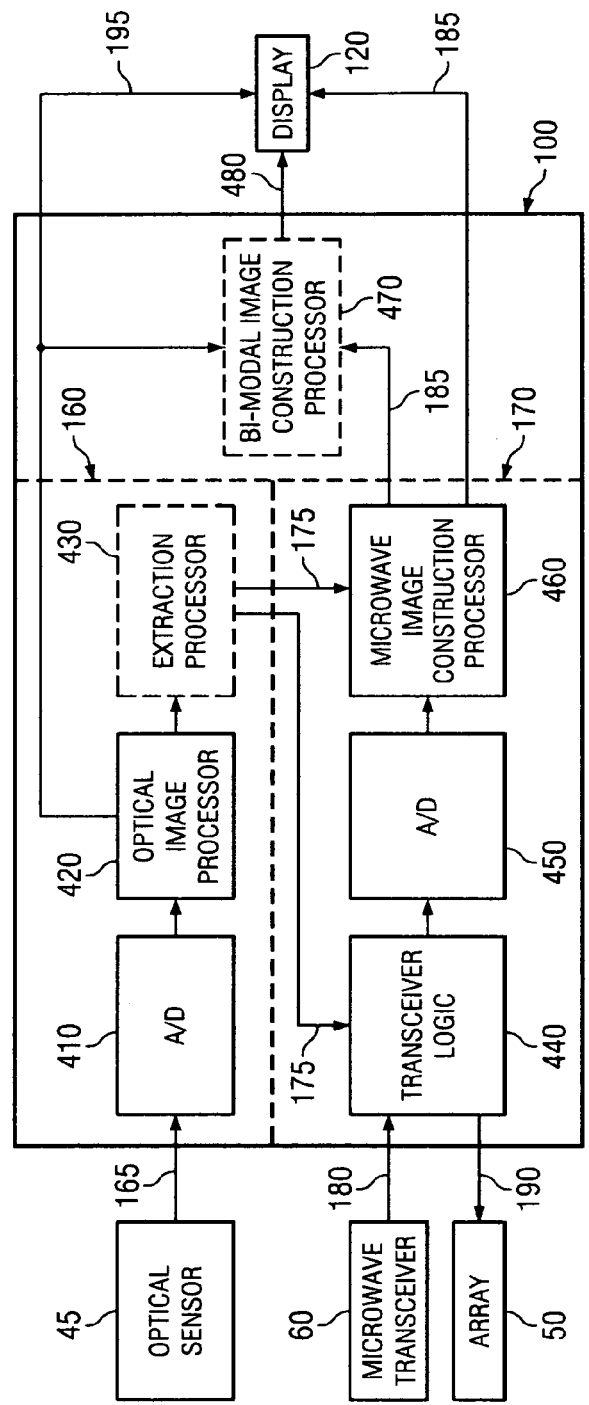
FIG. 9 is a block diagram of a bi-modal image processing system that augments a microwave imaging system with an optical imaging system, in accordance with embodiments of the present invention.

FIG. 9 is a block diagram of an image processing system in which a microwave imaging system is augmented with an optical imaging system, in accordance with embodiments of the present invention. The image processing system includes an optical image sensor 45, the microwave transceiver 60, the antenna array 50 and the processor 100. The processor 100 includes an optical processing system 160, a microwave processing system 170 and a bi-modal image construction processor 470.

The optical processing system 160 includes an analog-to-digital (A/D) converter 410, optical image processor 420 and extraction processor 430. In one embodiment, optical image processor 420 and extraction processor 430 are ASICs or FPGA circuits configured to perform the functions described below. In another embodiment, optical image processor 420 and extraction processor 430 are combined in a general-purpose processor that executes algorithms to perform the functions described below.

The optical processing system 160 receives from the sensor 45 within the optical camera 40 (shown in FIG. 1) optical image data 165 representing an optical image. The optical image data 165 is converted from analog to digital by A/D converter 410 and passed to the optical image processor 420 to process the digital optical image data. For example, if the sensor 45 is a color sensor incorporating a color filter array, the optical image processor 420 can demosaic the image. Demosaicing is a process by which missing color values for each pixel location are interpolated from neighboring pixels. There are a number of demosaicing methods known in the art today. By way of example, but not limitation, various demosaicing methods include pixel replication, bilinear interpolation and median interpolation. Other types of processing that may be performed by the optical image processor 420 include noise filtering and image enhancement. The resulting processed optical image data 195 can be output to display 120 for display of the optical image thereon and/or passed to either the extraction processor 430 or the bi-modal image construction processor 470 for further processing.

Extraction processor 430 is connected to receive the processed optical image data 195 from the optical image processor 420, and operates to extract optical image information 175 from the processed optical image data 195. There are a number of fast and simple known algorithms that can be used to extract the optical image information 175 from the image data 195. For example, in one embodiment, extraction processor 430 extracts the 3D surface of an object using an image construction algorithm for three-dimensional images. An example of an image construction process for three-dimensional images is described in co-pending and commonly assigned U.S. patent application Ser. No. 10/392,758, filed Mar. 20, 2003, in which an illumination gradient is used to spatially vary the intensity and/or spectral characteristics of the reflected illumination from the object in order to determine surface gradients at spatial locations on the surface of the object. The surface gradients are then used to construct a three-dimensional image of the object. Other three-dimensional image construction processes include laser triangulation, stereoscopic imaging, structured light and photometric stereo. For example, various three-dimensional image construction processes are described in Horn et al., "Toward Optimal Structured Light Patterns," IEEE Proceedings International Conference on Recent Advances in 3-D Digital Imaging and Modeling, Ottowa, Ontario, Canada, May 12-15, 1997, pp. 28-35 and Beraldin et al., "Optimized Position Sensors for Flying-Spot Active Triangulation System," IEEE Proceedings International Conference on Recent Advances in 3-D Digital Imaging and Modeling, Banff, Albertta, Canada, Oct. 6-10, 2003, pp. 29-36.

In another embodiment, extraction processor 430 extracts features of the object that are of interest. It should be understood that as used herein, the phrase "features of the object" includes measurements of the object, components on a surface of or within the object or other indicia of the object. In further embodiments, extraction processor 430 extracts any other information from the image data 195 that is desired. In embodiments in which the extraction processor 430 is used, the optical image information 175 is output by the extraction processor 430 to the microwave processing system 170 for use in constructing the microwave image.

The microwave processing system 170 includes transceiver logic 440, A/D converter 450 and microwave image construction processor 460. In one embodiment, transceiver logic 440 and microwave image construction processor 460 are ASICs or FPGA circuits configured to perform the functions described below. In another embodiment, transceiver logic 440 and microwave image construction processor 460 are combined in a general-purpose processor that executes algorithms to perform the functions described below.

As is understood, the transceiver logic 440 receives microwave measurements 180 representing the intensity of microwave illumination reflected from a target associated with the object from the microwave transceiver 60. The microwave measurements 180 are converted from analog to digital by A/D converter 450 and passed to the microwave image construction processor 460 to construct a microwave image of the object. The microwave image construction processor 460 produces microwave image data 185 representing the microwave image of the object, and in one embodiment, transmits the microwave image data 185 to the display 120 for display of the microwave image thereon. In another embodiment, the microwave image construction processor 460 passes the microwave image data 185 to the bi-modal image construction processor 470 for further processing.

In embodiments in which the extraction processor 430 is used, the optical image information 175 output by the extraction processor 430 is received at either one or both of the transceiver logic 440 and the microwave image construction processor 460. In one embodiment, the optical image information 175 identifies data points corresponding to spatial regions of interest associated with the object. In one implementation embodiment, the transceiver logic 440 uses the optical image information 175 to provide instructions 190 to the array 50 to program the antenna elements to direct the microwave radiation to the spatial regions (or regions) of interest. In another implementation embodiment, the microwave image construction processor 460 uses the optical image information 175 to construct the microwave image using the measurements 180 corresponding to the identified data points.

With the optical image information 175, the actual volume occupied by the object being interrogated can be identified to determine what data points in the volume really need to be solved for. Thus, in the discrete-sampling of the space, only relevant data points need to be addressed. Depending on the maximum allowed volume to analyze, and the minimum that can be encountered, the computational load can be significantly reduced.

In embodiments in which the microwave image and optical image are combined to produce a bi-modal image, the processed optical image data 195 and microwave image data 195 are passed to the bi-modal image construction processor 470 to produce bi-modal image data 480 representing a bi-modal image. In one embodiment, the bi-modal image processor 470 operates to add the microwave image data 185 to the processed optical image data 195 to produce the bi-modal image data 480. In another embodiment, the bi-modal image processor 470 operates to subtract one image (microwave or optical) from the other to produce the bi-modal image data 480. The bi-modal image data 480 may further be passed to the display 120 for display of the bi-modal image thereon.

Figure 10:
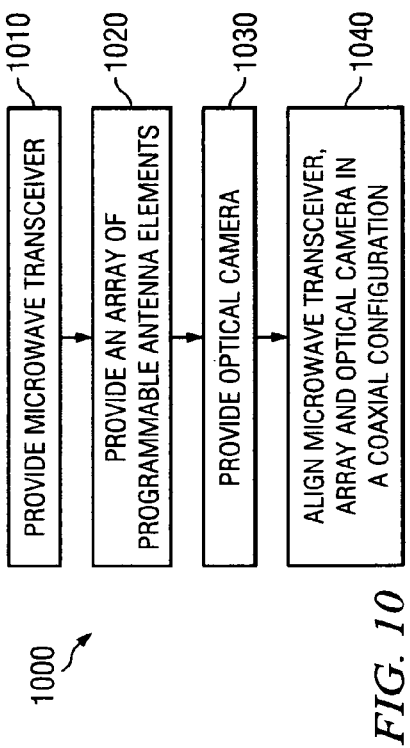
FIG. 10 is a flow chart illustrating an exemplary process for producing a coaxial bi-modal imaging system, in accordance with embodiments of the present invention.

FIG. 10 is a flow chart illustrating an exemplary process 1000 for producing a coaxial bi-modal imaging system, in accordance with embodiments of the present invention. At block 1010, a microwave transceiver operable to emit microwave radiation to illuminate an object and to receive reflected microwave radiation reflected from the object to capture a microwave image of the object is provided. In addition, at block 1020, an antenna array including a plurality of antenna elements, each programmable with a respective transmit direction coefficient to direct the microwave radiation emitted from the microwave transceiver toward a target on the object, and each programmable with a respective receive direction coefficient to direct the reflected microwave radiation reflected from the target towards the microwave transceiver is provided. Furthermore, at block 1030, an optical camera configured to capture an optical image of the object is provided. Thereafter, at block 1040, the microwave transceiver, antenna array and optical camera are aligned in a coaxial configuration to produce a compact bi-modal imaging system with reduced image processing complexity.

As will be recognized by those skilled in the art, the innovative concepts described in the present application can be modified and varied over a wide rage of applications. Accordingly, the scope of patents subject matter should not be limited to any of the specific exemplary teachings discussed, but is instead defined by the following claims.

We claim:

1. A bi-modal imaging system, comprising:
   a microwave transceiver to emit microwave radiation to illuminate an object and to receive reflected microwave radiation reflected from the object to capture a microwave image of the object;
   an antenna array including a plurality of antenna elements, each programmed with a respective transmit direction coefficient to direct the microwave radiation emitted from said microwave transceiver toward a target on the object, and each programmed with a respective receive direction coefficient to direct the reflected microwave radiation reflected from said target towards said microwave transceiver; and an optical camera to capture an optical image of said object;

wherein said microwave transceiver, said antenna array and said optical camera are aligned in a coaxial configuration.

2. The system of claim 1, wherein said microwave transceiver, said antenna array and said optical camera are aligned along an axis extending therethrough.

3. The system of claim 2, wherein said axis is orthogonal to the plane of said antenna array and extends through a center of said antenna array.

4. The system of claim 1, wherein said microwave transceiver is mounted to said antenna array to emit microwave radiation from a front side of said microwave transceiver towards said antenna elements and said optical camera is mounted to a back side of said microwave transceiver opposite said front side to receive light directed towards said back side of said microwave transceiver.

5. The system of claim 1, further comprising:
a reflective disc to reflect the microwave radiation emitted from said microwave transceiver towards said antenna elements and to reflect the reflected microwave radiation reflected from said antenna elements towards said microwave transceiver.

6. The system of claim 5, wherein a back side of said microwave transceiver is mounted to said antenna array and said reflective disc is mounted to a front side of said microwave transceiver such that said microwave transceiver emits microwave radiation from the front side of said microwave transceiver towards a reflective surface said reflective disc; and wherein said optical camera is mounted to said reflective disc opposite said reflective surface to receive light directed towards said front side of said microwave transceiver.

7. The system of claim 5, wherein said microwave transceiver is mounted to a back side of said antenna array and said reflective disc is mounted to a front side of said antenna array such that said microwave transceiver emits microwave radiation through a hole in said antenna array towards a reflective surface said reflective disc; and wherein said optical camera is mounted to said reflective disc opposite said reflective surface to receive light directed towards said front side of said antenna array.

8. The system of claim 1, wherein said antenna array has a curved surface.

9. The system of claim 1, further comprising:
a processor to measure a respective intensity of the reflected microwave radiation to determine a value of a voxel within the microwave image of the object, and wherein said processor constructs the microwave image of the object by programming said antenna elements to scan multiple targets on the object to measure the respective intensity of reflected microwave radiation from each of the multiple targets.

10. The system of claim 9, wherein said optical camera includes a plurality of photo detectors, each to measure the intensity of light received at the photo detector and to produce optical image data representative thereof, and wherein said processor receives the optical image data from said optical camera, process said optical image data to produce processed optical image data and produce the optical image from the processed optical image data.

11. The system of claim 10, wherein said processor produces a bi-modal image from a combination of the optical image and the microwave image.

12. The system of claim 11, further comprising:
a display operably coupled to said processor to display at least one of the optical image, the microwave image and the bi-modal image.

13. The system of claim 10, wherein said processor extracts optical image information from the optical image data and to use said optical image information to identify a region of interest associated with the object and to control said array to illuminate only targets within the region of interest to produce the microwave image with only the region of interest.

14. The system of claim 1, wherein each of said plurality of antenna elements are discrete phase-delayed antenna elements, phase-shifted antenna elements, amplitude-delayed antenna elements or amplitude-shifted antenna elements.

15. A method for producing a coaxial bi-modal imaging system, comprising:
providing a microwave transceiver to emit microwave radiation to illuminate an object and to receive reflected microwave radiation reflected from the object to capture a microwave image of the object;

providing an antenna array including a plurality of antenna elements, each programmed with a respective transmit direction coefficient to direct the microwave radiation emitted from said microwave transceiver toward a target on the object, and each programmed with a respective receive direction coefficient to direct the reflected microwave radiation reflected from said target towards said microwave transceiver;

providing an optical camera to capture an optical image of said object; and aligning said microwave transceiver, said antenna array and said optical camera in a coaxial configuration.

16. The method of claim 15, wherein said aligning further comprises:
aligning said microwave transceiver, said antenna array and said optical camera along an axis extending therethrough.

17. The method of claim 16, wherein said axis is orthogonal to the plane of said antenna array and extends through a center of said antenna array.

18. The method of claim 15, wherein said aligning further comprises:
mounting said microwave transceiver to said antenna array to emit microwave radiation from a front side of said microwave transceiver towards said antenna elements; and mounting said optical camera to a back side of said microwave transceiver opposite said front side to receive light directed towards said back side of said microwave transceiver.

19. The method of claim 15, further comprising:
providing a reflective disc to reflect the microwave radiation emitted from said microwave transceiver towards said antenna elements and to reflect the reflected microwave radiation reflected from said antenna elements towards said microwave transceiver.

20. The method of claim 19, wherein said aligning further comprises:
mounting a back side of said microwave transceiver to said antenna array;

mounting said reflective disc to a front side of said microwave transceiver such that said microwave transceiver emits microwave radiation from the front side of said microwave transceiver towards a reflective surface said reflective disc; and mounting said optical camera to said reflective disc opposite said reflective surface to receive light directed towards said front side of said microwave transceiver.

21. The method of claim 19, wherein said aligning further comprises:

mounting said microwave transceiver to a back side of said antenna array;

mounting said reflective disc to a front side of said antenna array such that said microwave transceiver emits microwave radiation through a hole in said antenna array towards a reflective surface said reflective disc; and mounting said optical camera to said reflective disc opposite said reflective surface to receive light directed towards said front side of said antenna array.

22. The method of claim 15, further comprising:

measuring a respective intensity of the reflected microwave radiation to determine a value of a voxel within the microwave image of the object;

constructing the microwave image of the object by programming said antenna elements to scan multiple targets on the object to measure the respective intensity of reflected microwave radiation from each of the multiple targets.

23. The method of claim 22, wherein said providing said optical camera further includes providing said optical camera with a plurality of photo detectors to measure the intensity of light received at the photo detector and to produce optical image data representative thereof; and further comprising:

processing said optical image data to produce processed optical image data; and producing the optical image from the processed optical image data.

24. The method of claim 23, further comprising:

producing a bi-modal image from a combination of the optical image and the microwave image.

25. The system of claim 24, further comprising:

displaying at least one of the optical image, the microwave image and the bi-modal image.

26. The method of claim 23, further comprising:

extracting optical image information from the optical image data;

using said optical image information to identify a region of interest associated with the object; and controlling said array to illuminate only targets within the region of interest to produce the microwave image with only the region of interest.

* * * * *